United States Patent
Belowich et al.

(10) Patent No.: US 10,221,270 B2
(45) Date of Patent: Mar. 5, 2019

(54) LATEX FUNCTIONALIZED WITH PHOSPHORUS ACID AND PHOTOINITIATOR GROUPS

(71) Applicants: Dow Global Technologies LLC, Midland, MI (US); Rohm and Haas Company, Collegeville, PA (US)

(72) Inventors: Matthew Belowich, Midland, MI (US); Meghan Koback, Collegeville, PA (US); Jordan Stracke, Spring City, PA (US); Joseph Tanzer, Collegeville, PA (US)

(73) Assignees: Rohm and Haas Company, Philadelphia, PA (US); Dow Global Technologies, LLC, Midland, MI (US)

( * ) Notice: Subject to any disclaimer, the term of this patent is extended or adjusted under 35 U.S.C. 154(b) by 50 days.

(21) Appl. No.: 15/641,717

(22) Filed: Jul. 5, 2017

(65) Prior Publication Data

US 2018/0016376 A1    Jan. 18, 2018

Related U.S. Application Data

(60) Provisional application No. 62/362,326, filed on Jul. 14, 2016.

(51) Int. Cl.

| | |
|---|---|
| C08F 220/14 | (2006.01) |
| C08F 265/06 | (2006.01) |
| C09D 133/14 | (2006.01) |
| C09D 151/00 | (2006.01) |
| C08F 275/00 | (2006.01) |
| C09D 133/08 | (2006.01) |
| C09D 143/02 | (2006.01) |
| C09D 151/06 | (2006.01) |

(52) U.S. Cl.
CPC .......... *C08F 220/14* (2013.01); *C08F 265/06* (2013.01); *C08F 275/00* (2013.01); *C09D 133/08* (2013.01); *C09D 133/14* (2013.01); *C09D 143/02* (2013.01); *C09D 151/003* (2013.01); *C09D 151/06* (2013.01)

(58) Field of Classification Search
CPC .... C08F 220/14; C08F 265/06; C08F 275/00; C08F 230/02; C08F 220/06; C08F 220/36; C08F 2220/1858; C08F 2220/1825; C08F 2220/302; C09D 133/14; C09D 151/003; C09D 133/08; C09D 151/06; C09D 143/02
See application file for complete search history.

(56) References Cited

U.S. PATENT DOCUMENTS

| | | | |
|---|---|---|---|
| 4,256,827 A * | 3/1981 | Noguchi et al. | G03C 8/54 428/500 |
| 5,439,970 A | 8/1995 | Reeb | |
| 2002/0022688 A1 | 2/2002 | Tysak et al. | |
| 2015/0175832 A1 | 6/2015 | Bohling et al. | |

FOREIGN PATENT DOCUMENTS

| | | |
|---|---|---|
| EP | 2611844 B1 | 7/2015 |
| WO | 2012145857 A1 | 11/2012 |

* cited by examiner

*Primary Examiner* — Nathan M Nutter
(74) *Attorney, Agent, or Firm* — Reid S. Willis

(57) ABSTRACT

The present invention is a composition comprising a stable aqueous dispersion of polymer particles comprising structural units of a phosphorus acid monomer or a salt thereof and structural units of a photoinitiator monomer. Gloss retention of paints containing the latex described herein is markedly improved over paints that do not have photoinitiator chemically bound to the latex particles.

7 Claims, No Drawings

LATEX FUNCTIONALIZED WITH PHOSPHORUS ACID AND PHOTOINITIATOR GROUPS

The present invention relates to a composition comprising a stable aqueous dispersion of polymer particles (i.e., a latex) functionalized with phosphorus acid groups and photoinitiator groups. The composition is useful in paints for retaining gloss and improving dirt pick-up resistance in exterior coating applications.

One of the most effective ways to improve the exterior durability of acrylic paints is to add a small amount (typically ≤1.0%) of benzophenone to the paint. Nevertheless, after 1 to 2 years of exterior exposure (or ~1500 hours of accelerated weathering in the QUV), most paints lose a significant amount of gloss. Moreover, benzophenone suffers from other disadvantages including: 1) classification as a volatile organic compound (VOC); 2) leaching over time; and 3) potential toxicity. Therefore, it would be an advantage in the field of exterior coatings to find a way to maintain gloss over an extended period of time without the use of a material with the disadvantages of benzophenone.

SUMMARY OF THE INVENTION

The present invention addresses a need in the field of exterior coatings by providing a composition comprising a stable aqueous dispersion of polymer particles comprising structural units of a phosphorus acid monomer or a salt thereof and structural units of a photoinitiator monomer, wherein the concentration of structural units of the phosphorus acid monomer or salt thereof is in the range of from 0.2 to 5 weight percent, based on the weight of the polymer particles; and the concentration of structural units of the photoinitiator monomer is in the range of from 0.05 to 10 weight percent, based on the weight of the polymer particles. The composition of the present invention provides a way to improve gloss over an extended period of time without the VOC, toxicity, and regulatory issues associated with benzophenone.

DETAILED DESCRIPTION OF THE INVENTION

The present invention is a composition comprising a stable aqueous dispersion of polymer particles comprising structural units of a phosphorus acid monomer or a salt thereof and structural units of a photoinitiator monomer, wherein the concentration of structural units of the phosphorus acid monomer or salt thereof is in the range of from 0.2 to 5 weight percent, based on the weight of the polymer particles; and the concentration of structural units of the photoinitiator monomer is in the range of from 0.05 to 10 weight percent, based on the weight of the polymer particles.

The composition of the present invention is preferably a stable aqueous dispersion of acrylic based polymer particles. As used herein, the term "acrylic-based polymer particles" refers to polymer particles (including seed polymer particles) that comprise at least 30 weight percent, based on the weight of the polymer particles, structural units of methacrylate and or acrylate monomers. Preferably, the acrylic based polymer particles comprise structural units of one or more methacrylate monomers such as methyl methacrylate, ethyl methacrylate, and ureido methacrylate; and one or more acrylate monomers such as ethyl acrylate, butyl acrylate, 2-propylheptyl acrylate, and 2-ethylhexyl acrylate. The acrylic-based polymers may also include structural units of other monomers such as styrene.

As used herein, the term "structural unit" of the named monomer refers to the remnant of the monomer after polymerization. For example, a structural unit of methyl methacrylate is as illustrated:

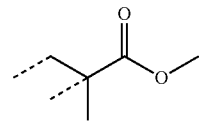

structural unit of methyl methacrylate where the dotted lines represent the points of attachment of the structural unit to the polymer backbone.

The polymer particles preferably comprise, based on the weight of the polymer particles, from 40 to 50 weight percent structural units of methyl methacrylate or styrene; from 23, more preferably from 25 weight percent to 33, more preferably to 30 weight percent structural units of 2-ethylhexyl acrylate; from 15 to 25 weight percent structural units of butyl acrylate; from 0.1, more preferably from 0.5 weight percent to 5, more preferably to 3, and most preferably to 2 weight percent structural units of ureido methacrylate; and from 0.05 to 2 weight percent structural units of methacrylic acid or acrylic acid or a salt thereof.

The polymer particles further comprise, based on the weight of the polymer particles, from 0.05, preferably from 0.1, more preferably from 0.2, and most preferably from 0.5 weight percent, to 10, preferably to 5, and more preferably to 3 weight percent structural units of the photoinitiator monomer; and from 0.2, preferably from 0.5, more preferably from 0.8 weight percent, to 5, preferably 3, more preferably to 2 weight percent structural units of the phosphorus acid monomer, based on the weight of the polymer particles.

The latex is advantageously prepared in two stages. In a first stage, an aqueous dispersion of the first polymer particles is preferably prepared by emulsion polymerization of monomers comprising a) methyl methacrylate or styrene or a combination thereof, preferably methyl methacrylate; b) one or more acrylates selected from the group consisting of ethyl acrylate, butyl acrylate, 2-propylheptyl acrylate, and 2-ethylhexyl acrylate, preferably a combination of butyl acrylate and 2-ethylhexyl acrylate; c) a carboxylic acid monomer or a salt thereof, such as acrylic acid, methacrylic acid, or itaconic acid, or a salt thereof. The kettle may optionally be buffered prior to the initiation of polymerization with a suitable base such as a dilute aqueous solution of $Na_2CO_3$.

The second stage also preferably comprises methyl methacrylate (and/or styrene), one or more of the aforementioned acrylates, and the carboxylic acid monomer. It has also been found advantageous to include a ureido functionalized monomer such as ureido methacrylate at a concentration preferably in the range of from 0.2, more preferably from 0.5 weight percent, to preferably 10, more preferably to 5, and most preferably to 3 weight percent, based on the weight of second stage monomers.

A photoinitiator monomer and a phosphorus acid monomer are also included in either the first or second stage of the reaction. Preferably, the phosphorus acid monomer and the photoinitiator monomer are staged together, either in the first or the second stage, more preferably together in the first stage. Though not bound by theory, it is believed that copolymerizing the phosphorus acid monomer and the photoinitiator monomer in the same stage, especially the first stage, provides a mechanism for the functionalized photoinitiator groups to be advantageously situated on the surface of the latex particles; such surface functionalization provides accessibility to UV light, which causes crosslinking promoted by the photoinitiator groups, thereby imparting the advantageous gloss retention and improved dirt pick-up resistance.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates. PEM, which is an especially preferred phosphorus acid monomer, is represented by the following structure:

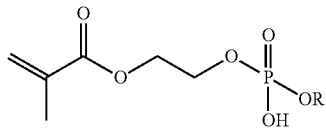

where R is H or

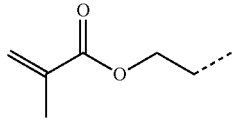

As used herein, the term "photoinitiator monomer" refers to a compound with benzoyl functionality and an ethylenically unsaturated group that is capable of polymerizing in an emulsion polymerization reaction. A class of compounds with benzoyl functionality and ethylenic unsaturation is a polymerizable class of compounds illustrated as follows:

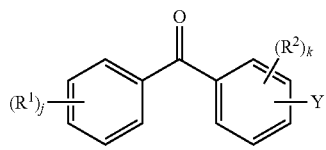

where j is 0, 1, 2, or 3; k is 0, 1, or 2; each $R^1$ and $R^2$ are independently $C_1$-$C_6$-alkyl, $CF_3$, OH, $NH_2$, COOH, or $COOCH_3$; or $R^1$ and $R^2$, together with the carbon atom to which they are attached, form a bridging S, O, NH, or $NH_3$ group; and Y is an organic hydrocarbon-containing radical optionally comprising at least one O, N, or S heteroatom, which radical further comprises an unsaturated substituent that is copolymerizable with an acrylic, methacrylic, styrene, or vinyl ester monomer.

Another class of suitable photoinitiator monomers is illustrated as follows:

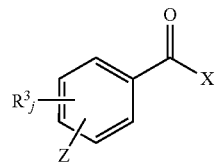

Where each $R^3$ is independently $CF_3$, $C_1$-$C_6$-alkyl, —O—$C_1$-$C_6$ alkyl, —COO—$C_1$-$C_6$-alkyl, halo, CN, COOH, or OH; X is $C_1$-$C_6$-alkyl; Z is an acrylate or methacrylate functionalized group.

Preferably, Z is characterized by the following formula:

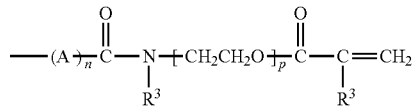

where A is O or $NR^3$; n is 0 or 1; p is 1 to 12; and each $R^3$ is independently H or $CH_3$.

Examples of specific photoinitiator monomers are illustrated below:

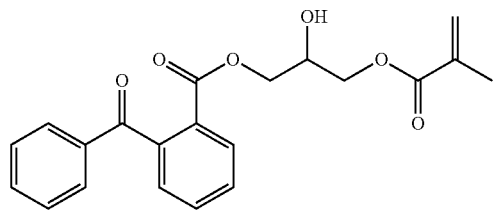

2-hydroxy-3-(methacryloyloxy)propyl 2-benzoylbenzoate

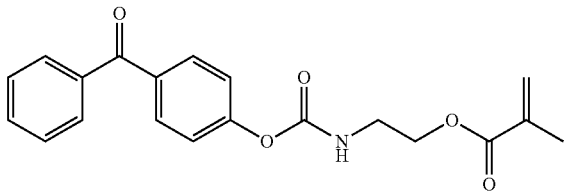

2-(((4-benzoylphenoxy)carbonyl)amino)ethyl methacrylate

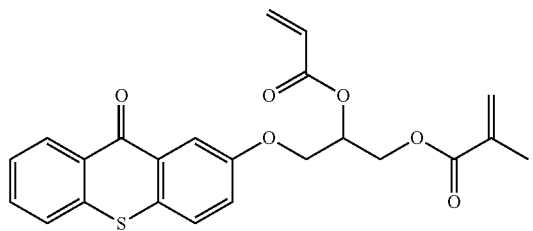

2-(acryloyloxy)-3-((9-oxo-9H-thioxanthen-2-yl)oxy)propyl methacrylate

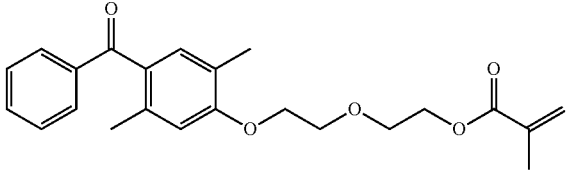

2-(2-(4-benzoyl-2,5-dimethylphenoxy)ethoxy)ethyl methacrylate

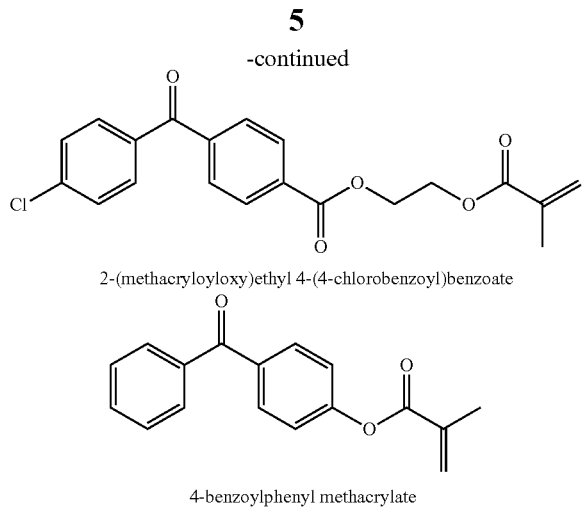

2-(methacryloyloxy)ethyl 4-(4-chlorobenzoyl)benzoate 4-benzoylphenyl methacrylate The weight-to-weight ratio of the first stage to the second stage is preferably in the range of 10:90 to 70:30, more preferably from 20:80 to 50:50; and most preferably from 25:75 to 40:60. Preferably, each stage comprises, from 20 to 30 weight percent structural units of 2-ethylhexyl acrylate, from 15 to 25 weight percent structural units of butyl acrylate, from 40 to 50 weight percent structural units of methyl methacrylate, from 0.4 to 1.2 weight percent structural units of acrylic acid or methacrylic acid.

The aqueous dispersion of polymer particles is useful as a binder in coatings formulations, more particularly paint formulations. Accordingly, in another aspect, the composition of the present invention further includes one or more materials selected from the group consisting of pigments, thickeners, dispersants, surfactants, coalescing agents, defoamers, adhesion promoters, biocides, and neutralizing agents.

It has surprisingly been discovered that gloss retention of paints containing the latex described herein is markedly improved over paints that do not have photoinitiator chemically bound to the latex particles. The paints are further advantaged by the absence of any leaching of the photoinitiator, decreased toxicity, and lower VOC than paints containing benzophenone.

The composition of the present invention is combined with other materials to make a paint and then tested for gloss retention.

Example 1—Preparation of 2-Stage Latex: Photoinitiator Monomer and Phosphorus Acid Monomer Added in the First Stage A first monomer emulsion was prepared by mixing deionized water (195 g), Disponil FES-993 surfactant (29.2 g, 30% active), 2-ethylhexyl acrylate (155.0 g), butyl acrylate (99.4 g), methyl methacrylate (227.2 g), phosphoethyl methacrylate (39.2 g, 60% active), methacrylic acid (4.6 g), and 2-hydroxy-3-(methacryloyloxy)propyl 2-benzoylbenzoate (38.3 g). To a 5-L, four-necked round bottom flask equipped with a paddle stirrer, a thermometer, nitrogen inlet, and a reflux condenser was added deionized water (929.2 g) and Disponil FES-32 surfactant (11.2 g, 31% active). The contents of the flask were heated to 83° C. under N$_2$ and stirring was initiated. A portion of the first monomer emulsion (112 g) was then added followed by a rinse of deionized water (40 g). A solution of ammonium persulfate (3.76 g) dissolved in deionized water (20 g) was added to the flask followed by a rinse of deionized water (5 g). After the maximum exotherm was observed, the remainder of the first monomer emulsion was added at a constant rate over 30 min while maintaining the temperature at 85° C. Simultaneously, 30% of an initiator solution of ammonium persulfate (3.49 g) in deionized water (85 g) was added separately over 30 min. Once the first monomer emulsion was fed, the flask containing the first monomer emulsion was rinsed with deionized water (30 g) and addition of the initiator solution was stopped. The reaction contents were held at 85° C. for 15 min. Meanwhile, a second monomer emulsion was prepared by mixing deionized water (337 g), Disponil FES-32 surfactant (36.0 g, 31% active), 2-ethylhexylacrylate (361.8 g), butyl acrylate (235.6 g), methyl methacrylate (706.8 g), methacrylic acid (10.7 g), and ureido-methacrylate (24.9 g). Ammonium hydroxide (13.9 g, 30% active) was added to the initiator solution followed by a rinse of deionized water (23.0 g). After the 15 min hold, the second monomer emulsion and the remainder of the initiator solution were added linearly and separately over 80 min while maintaining the temperature at 85° C. Once the feeds were complete, the monomer emulsion tank and the initiator solution were rinsed with deionized water (75 g and 5 g, respectively). The contents of the flask were cooled to 65° C. and a catalyst/activator pair was added to the flask to reduce residual monomer. The polymer was neutralized to pH 8.5 with ammonium hydroxide (30% active). The measured particle size using a Brookhaven BI 90 Plus particle analyzer was 110-130 nm, and the solid content was 50%.

Example 2—Preparation of 2-Stage Latex: Photoinitiator Monomer and Phosphorus Acid Monomer Added in the Second Stage A first monomer emulsion was prepared by mixing deionized water (307 g), Disponil FES-32 surfactant (20.5 g, 31% active), 2-ethylhexyl acrylate (206.7 g), butyl acrylate (139.8 g), methyl methacrylate (415.2 g), and methacrylic acid (3.8 g). To a 5-L, four necked round bottom flask equipped with a paddle stirrer, a thermometer, nitrogen inlet, and a reflux condenser was added deionized water (929.2 g) and Disponil FES-32 surfactant (11.2 g, 31% active). The contents of the flask were heated to 83° C. under N$_2$ and stirring was initiated. A portion of the first monomer emulsion (112 g) was then added followed by a rinse of the flask with deionized water (40 g). A solution of ammonium persulfate (3.76 g) dissolved in deionized water (20 g) was added to the flask followed by a rinse of deionized water (5 g). After the maximum exotherm was observed, the remainder of the first monomer emulsion was added at a constant rate over 35 min while maintaining the reaction temperature at 85° C. Simultaneously, 42% of an initiator solution of ammonium persulfate (3.49 g) in deionized water (170 g) was added separately over 35 min. Once the first monomer emulsion was fed, the flask was rinsed with deionized water (30 g) and the initiator solution was stopped. The reaction contents were held at 85° C. for 15 min. Meanwhile, a second monomer emulsion was prepared by mixing deionized water (397 g), Disponil FES-993 surfactant (58.5 g, 30% active), 2-ethylhexylacrylate (310.1 g), butyl acrylate (195.2 g), methyl methacrylate (530.3 g), methacrylic acid (11.5 g), phosphoethyl methacrylate (39.2 g, 60% active), ureido-methacrylate (24.9 g), and 2-hydroxy-3-(methacryloyloxy)propyl 2-benzoylbenzoate (38.2 g). After the 15-min hold, the second monomer emulsion and the remainder of the initiator solution were added linearly and separately over 85 min while maintaining the temperature at 85°

C. Once the feeds were complete, the monomer emulsion tank and the initiator solution were rinsed with deionized water (50 g and 5 g, respectively). The contents of the flask were cooled to 65° C. and a catalyst/activator pair was added to the flask to reduce residual monomer. The polymer was neutralized to pH 8.5 with ammonium hydroxide (30% active). The measured particle size using a Brookhaven BI 90 Plus particle analyzer was 110-130 nm, and the solid content was 48%.

Comparative Example 1—Preparation of 2-Stage Latex: Phosphorus Acid Monomer Added in the First Stage, No Addition of Photoinitiator Monomer The 2-stage polymer was prepared essentially as described in Example 1 except that no photoiniator monomer was used. The w/w stage ratio of the first stage to the second stage 30:70.

The relative w/w amounts of monomers used to prepare the first stage was 27 2-EHA/19.3 BA/46.2 MMA/6.7 PEM (60% active)/and 0.8 MAA; and the relative w/w amounts of monomers used to prepare the second stage was 27 2-EHA/ 19.3 BA/50.8 MMA/1.9 UMA/and 0.8 MAA. 2-EHA refers to 2-ethylhexyl acrylate; BA refers to butyl acrylate; MMA refers to methyl methacrylate; PEM refers to phosphoethyl methacrylate; UMA refers to ureido methacrylate; and MAA refers to methacrylic acid. Additionally, the Comparative Example 1 latex included 0.6% by weight benzophenone with respect to total solids in the latex. The experimental latexes were formulated into paint with other additives as illustrated in Table 1.

TABLE 1

Paint Formulation

| Stage | Material | Wt (g) | Wt (g) | Wt (g) |
|---|---|---|---|---|
| Grind | Water | 50.00 | 49.96 | 50.0 |
|  | TAMOL ™ 165A Dispersant | 4.20 | 4.20 | 4.20 |
|  | FoamStar A34 Defoamer | 1.00 | 1.00 | 1.00 |
|  | Ti-Pure R-746 Titanium Dioxide | 237.43 | 237.43 | 237.40 |
|  | ROCIMA ™ 63 Microbicide | 11.00 | 11.00 | 11.00 |
| Let-Down | Example 1 latex | 534.05 |  |  |
|  | Example 2 latex |  | 568.43 |  |
|  | Comparative Example 1 latex |  |  | 542.72 |
|  | Optifilm Enhancer 400 Coalescent | 9.13 | 9.20 | 9.23 |
|  | Texanol Ester Alcohol Coalescent | 6.98 | 7.03 | 7.06 |
|  | Ammonia (28% in water) | 0.40 | 0.40 | 0.50 |
|  | ACRYSOL ™ RM-3000 Thickener | 11.08 | 11.57 | 13.00 |
|  | ACRYSOL ™ RM-8W Thickener | 0.97 | 2.84 | 1.00 |
|  | Water | 134.75 | 100.22 | 126.92 |
|  | Total | 1001.00 | 1003.29 | 1004.05 |

TAMOL, ROCIMA, and ACRYSOL are all Trademarks of The Dow Chemical Company or its Affiliates.

QUV Measurements

The experimental paints were coated onto a substrate and subjected to accelerated weathering tests using the following procedure. Accelerated weathering was conducted using a QUV instrument according to the ASTM-D 4587, Standard Practice for Fluorescent UV-Condensation Exposures of Paint and Related Coatings. A cycle consisting of 8 h of UV exposure (0.89 W/m$^2$) at 60° C. followed by 4 h of a dark condensation period at 50° C. Formulations were coated (15-mil thickness) onto chromate treated aluminum panels and cured for 7-d in a controlled environment room (25° C., 50% RH) before initiating QUV exposure. Gloss was measured using a BYK Gardner micro-TRI-gloss meter at intervals of 500, 1500, and 2000 hours of QUV exposure. The results for change in 60° Gloss are shown in Table 2. In the table, Δ60 Ex. 1 refers to the changes in 60° gloss for the coating prepared from the paint that included the Example 1 latex; Δ60 Ex. 2 refers to the changes in 60° gloss for the coating prepared from the paint that included the Example 2 latex; and Δ60 Comp. Ex. 1 refers to the changes in 60° gloss for the coating prepared from the paint that included the Comparative Example 1 latex.

TABLE 2

Change in 60° Gloss units Upon QUV Accelerated Weathering

| Exposure (h) | 0 | 100 | 500 | 1500 | 2000 |
|---|---|---|---|---|---|
| $\Delta_{60}$ Ex. 1 | 79 | 76 | 77 | 81 | 82 |
| $\Delta_{60}$ Ex. 2 | 78 | 72 | 67 | 65 | 66 |
| $\Delta_{60}$ Comp. Ex. 1 | 79 | 69 | 74 | 83 | 51 |

The data demonstrate a pronounced loss in gloss at 2000 h for a coating derived from a paint that included free benzophenone as compared to one prepared from a paint containing a latex functionalized with chemically bound benzophenone groups. The results further demonstrate the advantages of copolymerizing PEM and the photoinitiator in the first stage of the latex.

Example 3—Preparation of 2-Stage Latex: Photoinitiator Monomer, Phosphorus Acid Monomer, and Ureido Methacrylate Added in the First Stage A first monomer emulsion was prepared by mixing deionized water (139 g), Disponil FES-993 surfactant (28.2 g, 30% active), 2-ethylhexyl acrylate (158.8 g), butyl acrylate (96.4 g), methyl methacrylate (230.2 g), phosphoethyl methacrylate (39.2 g, 60% active), methacrylic acid (4.7 g), and 2-hydroxy-3-(methacryloyloxy)propyl 2-benzoylbenzoate (72.6 g, 54% active). To a 5-L, four-necked round bottom flask equipped with a paddle stirrer, a thermometer, nitrogen inlet, and a reflux condenser was added deionized water (931 g) and Disponil FES-32 surfactant (11.9 g, 30% active). The contents of the flask were heated to 8° C. under $N_2$ and stirring was initiated. A portion of the first monomer emulsion (116.1 g) was then added followed by a rinse of deionized water (32 g). A solution of ammonium persulfate (4.0 g) dissolved in deionized water (26 g) was added to the flask. A solution of deionized water (15.0 g), Disponil FES-993 surfactant (3.0 g, 30% active), and ureido methacrylate (39.2 g, 50% active) was then added to the first monomer emulsion. After the maximum exotherm was observed, the remainder of the first monomer emulsion was added at a constant rate over 30 min while maintaining the temperature at 85° C. Simultaneously, 30% of an initiator solution of ammonium persulfate (3.7 g) in deionized water (118 g) was added separately over 30 min. Once the first monomer emulsion was fed, the flask containing the first monomer emulsion was rinsed with deionized water (15 g) and addition of the initiator solution was stopped. The reaction contents were held at 85° C. for 15 min. Meanwhile, a second monomer emulsion was prepared by mixing deionized water (398 g), Disponil FES-32 surfactant (39.4 g, 30% active), 2-ethylhexylacrylate (370.4 g), butyl acrylate (221.2 g), methyl methacrylate (769.4 g), methacrylic acid (11.0 g), and ammonium hydroxide (14.4 g, 29% active). After the 15 min hold, the second monomer emulsion and the remainder of the initiator solution were added linearly and separately over 80 min while maintaining the temperature at 85° C. Once the feeds were complete, the monomer emulsion tank and the initiator solution were rinsed with deionized water (30 g). The contents of the flask were cooled to 75° C. and a catalyst/activator pair was added to the flask to reduce residual monomer. The polymer was neutralized to pH 9.0 with ammonium hydroxide (29% active). The measured particle size using a Brookhaven BI 90 Plus particle analyzer was 110-130 nm, and the solid content was 51%.

Example 4—Preparation of 2-Stage Latex: Photoinitiator Monomer and Phosphorus Acid Monomer in the First Stage The 2-stage polymer was prepared essentially as described in Example 3 except that no ureido methacrylate monomer was used. The w/w stage ratio of the first stage to the second stage 30:70.

The relative w/w amounts of monomers used to prepare the first stage was 27.0 2-EHA/16.4 BA/39.2 MMA/6.7 PEM (60% active)/6.7 2-hydroxy-3-(methacryloyloxy)propyl 2-benzoylbenzoate/0.8 MAA, and the relative w/w amounts of monomers used to prepare the second stage was 27.0 2-EHA/16.12 BA/56.08 MMA/0.8 MAA.

Dirt Pick-up Resistance Measurements

Further experiments were carried out to demonstrate the effect of functionalizing the latex with ureido methacrylate on dirt pick-up resistance, as measured by Y-reflectance. A latex was prepared substantially as described in Example 1 except that the second stage monomer emulsion contained no ureido methacrylate. Paint compositions were prepared as described in Table 3 and substrates were coated with a paint containing the latex of Example 1 and one containing a similar latex that was not functionalized with ureido methacrylate. Paint formulations were drawn down over chromate-treated aluminum panels with a 5-mil applicator and were dried in a controlled environment room (25° C., 50% RH) overnight. Panels were then placed outside facing south at a 45° angle for 6 days. After outdoor exposure, initial Y-reflectance measurements were made. Next, samples were placed in a fox box for 1.5 h, and were then patted dry. A brown iron oxide slurry was brush applied, allowed to dry for 4 h, and was washed off under warm running water while rubbing with cheese cloth. After drying, final Y-reflectance values were measured. The retained Y-reflectance is equal to the final Y-reflectance divided by the initial Y-reflectance multiplied by 100%. Y-reflectance measurements were made using a BYK Gardner color-guide 45/0 meter. The brown iron oxide slurry was prepared by dispersing Davis Colors 641 Brown Iron Oxide (125 g) in water (250 g) and TAMOL™ 731A Dispersant (0.1 g). Retained Y-reflectance was found to be 95.7% for the paint containing the Example 1 latex and 93.2% for the paint containing the latex not functionalized with ureido methacrylate. The results, shown in Table 3, demonstrate that inclusion of ureido methacrylate in the polymer latex has a positive effect on dirt pick-up resistance.

TABLE 3

0 VOC Paint Formulations

| Material | Wt (g) | Wt (g) |
| --- | --- | --- |
| Water | 67.36 | 67.19 |
| Ti-Pure R-746 Titanium Dioxide | 129.19 | 129.19 |

TABLE 3-continued

0 VOC Paint Formulations

| Material | Wt (g) | Wt (g) |
| --- | --- | --- |
| Example 1 latex | 285.63 | |
| Example 1 latex without ureido methacrylate | | 285.46 |
| BYK-348 Surfactant | 1.10 | 1.10 |
| Rhodoline 643 Defoamer | 1.50 | 1.50 |
| Optifilm Enhancer 400 Coalescent | 11.67 | 11.67 |
| Ammonia (28% in water) | 0.70 | 0.52 |
| ACRYSOL ™ RM-2020NPR Thickener | 9.00 | 9.00 |
| ACRYSOL ™ RM-8W Thickener | 0.70 | 0.70 |
| Water | 0.30 | 0.48 |
| Total | 507.15 | 506.81 |

The invention claimed is:

1. A composition comprising a stable aqueous dispersion of polymer particles comprising structural units of a phosphorus acid monomer or a salt thereof and structural units of a photoinitiator monomer represented by either of the following formulas:

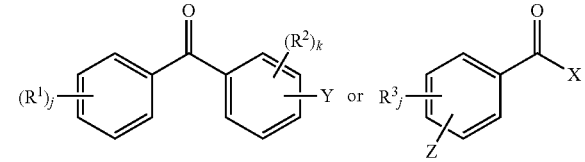

where j is 0, 1, 2, or 3; and k is 0, 1, or 2;
each $R^1$ and $R^2$ are independently $C_1$-$C_6$-alkyl, $CF_3$, OH, $NH_2$, COOH, or $COOCH_3$; or $R^1$ and $R^2$, together with the carbon atom to which they are attached, form a bridging S, O, NH, or N—$CH_3$ group;
each $R^3$ is independently $CF_3$, $C_1$-$C_6$-alkyl, —O—$C_1$-$C_6$-alkyl, —COO—$C_1$-$C_6$-alkyl, halo, CN, COOH, or OH;
X is $C_1$-$C_6$-alkyl;
Y is an organic hydrocarbon-containing radical optionally comprising at least one O, N, or S heteroatom, which radical further comprises an unsaturated substituent that is copolymerizable with an acrylic, methacrylic, styrene, or vinyl ester monomer; and
Z is an acrylate or methacrylate functionalized group;
wherein the concentration of structural units of the phosphorus acid monomer or salt thereof is in the range of from 0.2 to 5 weight percent, based on the weight of the polymer particles; and the concentration of structural units of the photoinitiator monomer is in the range of from 0.05 to 10 weight percent, based on the weight of the polymer particles.

2. The composition of claim 1 wherein the photoinitiator monomer is selected from the group consisting of 2-hydroxy-3-(methacryloyloxy)propyl 2-benzoylbenzoate; 2-(((4-benzoylphenoxy)carbonyl)amino)ethyl methacrylate; 2-(acryloyloxy)-3-((9-oxo-9H-thioxanthen-2-yl)oxy)propyl methacrylate; 2-(2-(4-benzoyl-2,5-dimethylphenoxy)ethoxy)ethyl methacrylate; 2-(methacryloyloxy)ethyl 4-(4-chlorobenzoyl)benzoate; and 4-benzoylphenyl methacrylate.

3. The composition of claim 2 wherein the polymer particles comprise from 0.8 to 2 weight percent structural units of phosphoethyl methacrylate and from 0.2 to 5 weight percent structural units of the photoinitiator monomer, based on the weight of the polymer particles, wherein the photoinitiator monomer is 2-hydroxy-3-(methacryloyloxy)propyl 2-benzoylbenzoate.

4. The composition of claim 3 wherein the polymer particles further comprise 40 to 50 weight percent structural units of methyl methacrylate or styrene; from 15 to 25 weight percent structural units of butyl acrylate, from 23 to 33 weight percent structural units of 2-ethylhexyl acrylate; from 0.05 to 2 weight percent structural units of methacrylic acid or a salt thereof.

5. The composition of claim 4 wherein the polymer particles further comprise from 0.1 to 5 weight percent structural units of ureido methacrylate, based on the weight of the polymer particles.

6. The composition of claim 1 wherein the phosphorus acid monomer or salt thereof is phosphoethyl methacrylate or a salt thereof.

7. The composition of claim 6 wherein the polymer particles comprise from 0.5 to 3 weight percent structural units of phosphoethyl methacrylate or a salt thereof, based on the weight of the polymer particles.

\* \* \* \* \*